United States Patent
Kitamura et al.

(10) Patent No.: US 9,833,743 B2
(45) Date of Patent: Dec. 5, 2017

(54) REVERSE OSMOSIS TREATMENT DEVICE AND METHOD FOR CLEANING REVERSE OSMOSIS TREATMENT DEVICE

(71) Applicant: Hitachi, Ltd., Tokyo (JP)

(72) Inventors: Kotaro Kitamura, Tokyo (JP); Shinichi Yoshikawa, Tokyo (JP); Hiroki Miyakawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 269 days.

(21) Appl. No.: 14/366,339

(22) PCT Filed: Dec. 6, 2012

(86) PCT No.: PCT/JP2012/081700
§ 371 (c)(1),
(2) Date: Jun. 18, 2014

(87) PCT Pub. No.: WO2013/094428
PCT Pub. Date: Jun. 27, 2013

(65) Prior Publication Data
US 2014/0360937 A1    Dec. 11, 2014

(30) Foreign Application Priority Data

Dec. 19, 2011    (JP) .................................. 2011-277237

(51) Int. Cl.
*B01D 61/08*    (2006.01)
*B01D 65/02*    (2006.01)
(Continued)

(52) U.S. Cl.
CPC .......... *B01D 65/02* (2013.01); *B01D 61/022* (2013.01); *B01D 61/08* (2013.01); *B01D 61/12* (2013.01);
(Continued)

(58) Field of Classification Search
None
See application file for complete search history.

(56) References Cited

U.S. PATENT DOCUMENTS 4,482,461 A * 11/1984 Hindman ............. B01D 29/114
210/108
6,402,956 B1 * 6/2002 Andou ................. B01D 61/022
210/321.74
(Continued)

FOREIGN PATENT DOCUMENTS

JP    S51-99682 A    9/1976
JP    08-126882    5/1996
(Continued)

OTHER PUBLICATIONS

Jun. 3, 2015 Notice of Reasons for Refusal issued in Japanese Patent Application No. 2011-277237.
(Continued)

*Primary Examiner* — Bobby Ramdhanie
*Assistant Examiner* — Michael An
(74) *Attorney, Agent, or Firm* — Oliff PLC

(57) ABSTRACT

A reverse osmosis treatment device includes: a first pressure vessel for treating an untreated water to produce a primarily treated water and a first permeated water; a second pressure vessel for treating the primarily treated water to produce a secondarily treated water and a second permeated water; a first cleaning solution tank for storing a first cleaning solution for cleaning the first pressure vessel; and a second cleaning solution tank for storing a second cleaning solution for cleaning the second pressure vessel. Each of the first pressure vessel and the second pressure vessel has therein a reverse osmosis membrane element having a reverse osmosis membrane. The first cleaning solution tank is connected to the first concentrate outlet pipe of the first pressure vessel, (Continued)

and the second cleaning solution tank is connected to the inlet pipe for the primarily treated water of the second pressure vessel.

9 Claims, 15 Drawing Sheets

(51) Int. Cl.
| | |
|---|---|
| C02F 1/44 | (2006.01) |
| B01D 63/12 | (2006.01) |
| B01D 61/02 | (2006.01) |
| B01D 61/12 | (2006.01) |
| C02F 1/00 | (2006.01) |
| C02F 1/52 | (2006.01) |
| C02F 1/76 | (2006.01) |
| C02F 103/08 | (2006.01) |
| C02F 101/12 | (2006.01) |

(52) U.S. Cl.
CPC .............. *B01D 63/12* (2013.01); *C02F 1/441* (2013.01); *B01D 2311/04* (2013.01); *B01D 2313/46* (2013.01); *B01D 2313/48* (2013.01); *B01D 2317/022* (2013.01); *B01D 2317/025* (2013.01); *B01D 2317/027* (2013.01); *B01D 2321/02* (2013.01); *B01D 2321/04* (2013.01); *B01D 2321/16* (2013.01); *B01D 2321/162* (2013.01); *B01D 2321/164* (2013.01); *B01D 2321/40* (2013.01); *C02F 1/004* (2013.01); *C02F 1/008* (2013.01); *C02F 1/5245* (2013.01); *C02F 1/76* (2013.01); *C02F 2101/12* (2013.01); *C02F 2103/08* (2013.01); *C02F 2209/03* (2013.01); *C02F 2209/05* (2013.01); *C02F 2209/11* (2013.01); *C02F 2301/08* (2013.01); *C02F 2303/16* (2013.01)

(56) References Cited

U.S. PATENT DOCUMENTS

| | | | |
|---|---|---|---|
| 2005/0067341 A1* | 3/2005 | Green | B01D 61/022 210/321.69 |
| 2007/0181497 A1* | 8/2007 | Liberman | B01D 61/025 210/636 |
| 2008/0173583 A1* | 7/2008 | Boodoo | C02F 1/42 210/652 |
| 2012/0118824 A1* | 5/2012 | Kashihara | B01D 61/58 210/641 |
| 2013/0060384 A1* | 3/2013 | Subbiah | B01D 61/12 700/266 |
| 2013/0280773 A1* | 10/2013 | Takeuchi | C12M 29/04 435/139 |

FOREIGN PATENT DOCUMENTS

| | | | |
|---|---|---|---|
| JP | 2001-259381 A | 9/2001 | |
| JP | 2002-095936 | 4/2002 | |
| JP | 2010-162519 | 7/2010 | |
| WO | WO 2011/01641 A1 * | 2/2011 | |
| WO | WO 2011/13201 A1 * | 10/2011 | B01D 61/12 |

OTHER PUBLICATIONS

"Measure against Deterioration of Membrane and Fouling." Edited by limited company Bookers, stock company S.T.S. pp. 140-143, 311, 312, Sep. 5, 2008.

May 4, 2015 Notice of Reasons for Refusal issued in Chinese Patent Application No. 2012800627888.

Zhang, Bao Zong. "Reverse Osmosis Water Treatment Application Technology". China Electric Power Publishing Company, Mar. 2004.

* cited by examiner

FIG. 10

| Valve No. | Cleaning of the first vessel | Cleaning of the second vessel | Simultaneous cleaning of the first and second vessels |
|---|---|---|---|
| V101 | Close | Close | Close |
| V102 | Close | Close | Close |
| V103 | Close | Open | Open |
| V104 | Open | Close | Open |
| V105 | Open | Close | Open |
| V106 | Close | Open | Open |
| V107 | Close | Open | Open |
| V108 | Close | Close | Close |
| Pump No. | | | |
| P101 | ON | OFF | ON |
| P102 | OFF | ON | ON |

FIG. 13

| Category of the fouling | Type of the fouling | Reagent used | Concentration |
|---|---|---|---|
| Organic | Organic foulings | NaOH | 0.1% |
| | | Sodium dodecyl sulfate | 0.025% |
| | | Sodium triphosphate | 0.1% |
| | | EDTA | 1.0% |
| | | Water | 98.775% |
| | Biofilm | NaOH | 0.1% |
| | | EDTA | 1.0% |
| | | Water | 98.9% |
| Inorganic | Inorganic salts (carbonates, sulfates) | Hydrochloric acid | 0.2% |
| | | Phosphoric acid | 0.5% |
| | | Citric acid | 2.0% |
| | | Water | 97.3% |
| | Metal Oxide | Phosphoric acid | 0.5% |
| | | Sulfuric acid | 1.0% |
| | | Water | 98.5% |
| | Inorganic colloids (Silt) | NaOH | 1.0% |
| | | Sodium dodecyl sulfate | 0.025% |
| | | Water | 98.975% |
| | Silica | NaOH | 0.1% |
| | | EDTA | 1.0% |
| | | Water | 98.9% |

REVERSE OSMOSIS TREATMENT DEVICE AND METHOD FOR CLEANING REVERSE OSMOSIS TREATMENT DEVICE

TECHNICAL FIELD

This invention relates to a reverse osmosis treatment device and a method for cleaning the reverse osmosis treatment device. More specifically, this invention relates to a reverse osmosis treatment device and a method for cleaning the reverse osmosis treatment device capable of effectively cleaning the reverse osmosis treatment device.

BACKGROUND ART

A desalination device using a reverse osmosis membrane (hereinafter referred to as an RO membrane) is operated by using reverse osmotic pressure, and a plurality of serially connected RO membrane elements 222 are accommodated in a pressure vessel 224 having a cylindrical configuration as shown in FIG. 16. The RO membrane elements 222 are connected by their water collection pipe 234 at the center of each RO membrane element 222. The feedwater is fed to the desalination device from one end by a high pressure pump to pressurize the interior of the pressure vessel 224 by controlling the opening degree of the valve provided on the concentrated water side. When the applied pressure exceeds the osmotic pressure of the feedwater, the feed water permeates through the RO membrane and the desalinated water (permeated water) flows into the water collection pipe 234 provided at the center of the element.

When the water is supplied to the pressure vessel, the salt concentration increases from the feedwater side to the concentrated water side, and the pressure in the pressure vessel 224 is finally determined by the salt concentration at the final stage, amount of the permeated water, and flow rate of the feedwater on the membrane. Accordingly, excessive pressure is applied in the pressure vessel 224 on the feedwater side and amount of the permeated water increases on this side. For example, FIG. 17 shows relative flux in relation to the position of the RO membrane element with seven RO membrane elements 222 serially arranged. The position of the element in FIG. 17 is the number of elements counted from the feed water side. As shown in FIG. 17, a larger amount of water permeates through the RO membrane on the feedwater side, and amount of the permeated water decreases toward the concentrated water side. Since salt concentration of the water treated in the element increases toward the concentrated water side, a higher pressure is required on the concentrated water side while equal pressure is applied on the feedwater side. Because of such unevenness of the amount of the permeated water in the pressure vessel 224 as shown in FIG. 17, a higher power is required and fouling of the RO membrane element proceeds in the feedwater side.

With regard to the fouling of the RO membrane element, upstream side of the element where the untreated water is supplied tends to suffer from organic and microbial fouling (biofouling) while downstream side of the element from which concentrated water is discharged tends to suffer from scaling by inorganic substance. More specifically, the organic substances and microorganisms in the untreated water tend to be deposited on the RO membrane immediately after the introduction of the untreated water to the element while precipitation of the inorganic substance, that is, deposition of the contaminant inorganic substance on the RO membrane tends to occur on the RO membrane in the downstream side of the element where water treatment has proceeded to some extent and concentration of the water has increased.

In order to remove such fouling of the RO membrane, for example, Patent Literature 1 discloses heating of the reagent solution used for cleaning the reverse osmosis membrane blocked by organic polymer substance. Patent Literature 2 discloses a device which monitors performance of the reverse osmosis membrane and operates a cleaning unit when detecting fouling of the membrane. Patent Literature 3 discloses an exhaust gas treating device which cleans the exhaust gas by using a cleaning solution containing a nanovalve, while this cleaning is not the cleaning of an RO membrane.

PRIOR ART LITERATURE

Patent Literature

Patent Literature 1: Japanese Patent Application Laid-Open No. 2002-95936
Patent Literature 2: Japanese Patent Application Laid-Open No. Hei 8-126882
Patent Literature 3: Japanese Patent Application Laid-Open No. 2010-162519

SUMMARY OF INVENTION

Technical Problem

The cleaning processes described in Patent Literatures 1 to 3 required provision of additional valves, pressure gauges, pipes, and other components as well as system software. In the meanwhile, the RO membrane like the one shown in FIG. 16 experiences two types of fouling phenomena, namely, the fouling by organic substance and the fouling by inorganic substance in one vessel, and alternate use of two or more reagents such as an acid and an alkali was necessary. In addition, the reagent was required to be used at a large amount since both types of fouling occurred in the same one vessel and the reagents were required to be used for the cleaning of the entire vessel while each of the organic and inorganic fouling needed cleaning by the reagent adequate for each type of the fouling.

The present invention has been completed in view of the situation as described above, and an object of the present invention is to provide a reverse osmosis treatment device and a method for cleaning the reverse osmosis treatment device which reduce amount of the reagents used for the cleaning and improve the cleaning efficiency.

Solution to Problem

In order to achieve the objects as described above, the present invention provides a reverse osmosis treatment device. The reverse osmosis treatment device includes: a first pressure vessel for treating an untreated water by a primary treatment to produce a primarily treated water and a first permeated water; a second pressure vessel for treating the primarily treated water by a secondary treatment to produce a secondarily treated water and a second permeated water; a first cleaning solution tank for storing a first cleaning solution used for cleaning the first pressure vessel; and a second cleaning solution tank for storing a second cleaning solution used for cleaning the second pressure vessel. Each of the first pressure vessel and the second pressure vessel has therein a reverse osmosis membrane element or reverse osmosis membrane elements connected in series by a water collection tube for a permeated water to flow therethrough, the permeated water having passed through the reverse osmosis membrane elements. The first pressure vessel has one end having an untreated water inlet pipe for introducing the untreated water. The first pressure vessel has another end having a first concentrate outlet pipe for discharging the primarily treated water and having a first outlet pipe for discharging the first permeated water. The second pressure vessel has one end having an inlet pipe for the primarily treated water for introducing the primarily treated water. The second pressure vessel has another end having a second concentrate outlet pipe for discharging the secondarily treated water and having a second outlet pipe for discharging the second permeated water. The first cleaning solution tank is connected to the first concentrate outlet pipe of the first pressure vessel. The second cleaning solution tank is connected to the inlet pipe for the primarily treated water of the second pressure vessel.

In the present invention, the reverse osmosis treatment device is divided into the first pressure vessel and the second pressure vessel. When untreated water is introduced in the reverse osmosis treatment device, for example, the reverse osmosis membrane element in the first pressure vessel experiences organic and microbial fouling while the reverse osmosis membrane element in the second pressure vessel experiences inorganic fouling. Since the reverse osmosis treatment device has the first cleaning solution tank and the second cleaning solution tank containing a first cleaning solution and a second cleaning solution adequate for the cleaning of the first pressure vessel and the second pressure vessel, respectively, each pressure vessel is cleaned by a cleaning solution adequate for each type of fouling. In addition, in the case of the present invention wherein the pressure vessel is divided into the first pressure vessel and the second pressure vessel, length of each pressure vessel is shorter than the length of the pressure vessel when the device is constituted from a single undivided pressure vessel. As a result, amount of the cleaning solution supplied to each of the first pressure vessel and the second pressure vessel is reduced and unnecessary cleaning of the reverse osmosis membrane element is minimized, and this prevents damages on the reverse osmosis membrane element by the reagents in the cleaning solution and enables increase in the life of the membrane.

In the reverse osmosis treatment device according to another embodiment of the present invention, the first cleaning solution tank is connected to the untreated water inlet pipe, and the second cleaning solution tank is connected to the second concentrate outlet pipe.

In this reverse osmosis treatment device according another embodiment of the present invention, efficient circulation of the cleaning solution is realized since the first cleaning solution tank is connected to the untreated water inlet pipe, and the second cleaning solution tank is connected to the second concentrate outlet pipe.

The reverse osmosis treatment device according to further embodiment of the present invention includes a first pump for sending a first cleaning solution of the first cleaning solution tank from the first concentrate outlet pipe into the first pressure vessel, and then to the untreated water inlet pipe; and a second pump for sending a second cleaning solution of the second cleaning solution tank from the inlet pipe for the primarily treated water into the second pressure vessel, and then to the second concentrate outlet pipe.

In the first pressure vessel, the organic and microbial fouling in the untreated water tends to be deposited on the side of the untreated water inlet pipe, and in the second pressure vessel, the inorganic fouling tends to be deposited, on the side of the second concentrate outlet pipe. In this further embodiment of the present invention, the first pressure vessel is cleaned by the first cleaning solution flowing toward the untreated water inlet pipe and the second pressure vessel is cleaned by the second cleaning solution flowing toward the second concentrate outlet pipe, and accordingly, the cleaning water used for the part having heavier fouling is directly discharged, thus realizing efficient cleaning.

The reverse osmosis treatment device according further embodiment of the present invention includes pressure gauges provided at an upstream side for the untreated water and at a downstream side for the primarily treated water of the first pressure vessel, respectively; and pressure gauges at an upstream side for the primarily treated water and at a downstream side for the secondarily treated water of the second pressure vessel, respectively. Fouling of the first pressure vessel is detected by a pressure difference between the upstream side and the downstream side of the first pressure vessel. Fouling of the second pressure vessel is detected by a pressure difference between the upstream side and the downstream side of the second pressure vessel.

In this reverse osmosis treatment device according further embodiment of the present invention, fouling of the first pressure vessel is determined by the change in the pressure difference between the pressure measured in the upstream of the first pressure vessel (in the untreated water inlet pipe) and the pressure measured in the downstream of the first pressure vessel (in the first concentrate outlet pipe). Fouling of the second pressure vessel is determined by the change in the pressure difference between the pressure measured in the upstream of the second pressure vessel (in the inlet pipe for the primarily treated water) and the pressure measured in the downstream of the second pressure vessel (in the second concentrate outlet pipe). These enable convenient judgment of the fouling of the first and second pressure vessels. While the pressure difference is mainly determined by the pressure difference in the flow path, the determination may also be performed by combining transmembrane pressure difference (filtration pressure).

In the reverse osmosis treatment device according further embodiment of the present invention, the first cleaning solution in the first cleaning solution tank includes a cleaning solution which removes organic and microbial fouling, and the second cleaning solution in the second cleaning solution tank includes a cleaning solution which removes inorganic fouling.

In the reverse osmosis treatment device according further embodiment of the present invention, organic and microbial fouling tends to be deposited in the first pressure vessel, and inorganic fouling tends to be deposited in the second pressure vessel, and each pressure vessel is cleaned by a cleaning solution suitable for each type of fouling.

The reverse osmosis treatment device according to further embodiment of the present invention further includes a rinse solution tank for storing a rinse solution used for rinsing the first cleaning solution in the first pressure vessel and the second cleaning solution in the second pressure vessel.

In reverse osmosis treatment device according further embodiment of the present invention, the first and second cleaning solutions are readily removed after the cleaning of the first and the second pressure vessels since the device is provided with a rinse solution tank containing the solution for rinsing the first and second cleaning solutions.

In the reverse osmosis treatment device according further embodiment of the present invention, the rinse solution includes the first permeated water, the second permeated water or the untreated water.

In the reverse osmosis treatment device according further embodiment of the present invention, operation is readily resumed after cleaning the first pressure vessel and the second pressure vessel since the rinse solution used is the first permeated water or the second permeated water produced by the reverse osmosis treatment device or the untreated water.

The present invention also provides a method for cleaning a reverse osmosis treatment device. The method includes the steps of: confirming a pressure difference of a first pressure vessel for treating an untreated water by a primary treatment and a pressure difference of a second pressure vessel for treating, by a secondary treatment, a primarily treated water which has been treated by the primary treatment, to thereby determine degree of fouling of the first pressure vessel and the second pressure vessel; determining a specified pressure vessel to be cleaned from the first pressure vessel and the second pressure vessel based on the pressure difference of the first pressure vessel and the pressure difference of the second pressure vessel; selecting a cleaning solution containing a reagent depending on the specified pressure vessel having fouling which has been identified in the step of confirming the pressure difference; cleaning the specified pressure vessel with the cleaning solution; and confirming respective differential pressures of the first pressure vessel and the second pressure vessel after the cleaning step to thereby determine completion of the cleaning.

In the present invention, fouling in the first pressure vessel and fouling in the second pressure vessel are confirmed by the change in pressure difference of the first pressure vessel and pressure difference of the second pressure vessel, respectively, and the cleaning is carried out by using the cleaning solution suitably selected for each type of the fouling. Amount of the cleaning solutions used is reduced because the pressure vessel is divided into the first pressure vessel for the primary treatment and the second pressure vessel in which the water that has been treated by the primary treatment is treated, and each pressure vessel has shorter length. Accordingly, unnecessary cleaning by the cleaning solution is be omitted, and damages on the reverse osmosis membrane elements by the cleaning reagent are thereby prevented, and this results in the longer life of the membrane.

In the method for cleaning a reverse osmosis treatment device according to another embodiment, the method further includes the step of rinsing and removing the cleaning solution before or after the step of determining the completion of the cleaning.

In the method for cleaning a reverse osmosis treatment device according to another embodiment, the rinsing step is performed either before or after the step of determining the completion of the cleaning. When the rinsing step is performed before the determination of the cleaning completion, the fouling of the reverse osmosis membrane element is confirmed under the conditions actually used in the operation. When the rinsing step is performed after the determination of the cleaning completion, the completion of the cleaning is confirmed with the interior of the first pressure vessel or the second pressure vessel still filled with the cleaning solution, and replacement of the fluid in the pressure vessel is not required. Accordingly, use of reagent for the fluid replacement and loss of cleaning time is suppressed.

In the method for cleaning a reverse osmosis treatment device according to further embodiment, the rinse solution used in the rinsing step includes a permeated water produced by the reverse osmosis treatment device or the untreated water.

Since the permeated water produced in the reverse osmosis treatment device or the untreated water is used for the rinse solution in the method for cleaning a reverse osmosis treatment device according to further embodiment of the present invention, contamination of the pressure vessel with other fluids is avoided.

In the method for cleaning a reverse osmosis treatment device according to further embodiment, the cleaning is performed when increase in the pressure difference measured in the step of confirming the pressure difference reaches the range of 5% or more and 40% or less compared to the pressure difference before the use of the first pressure vessel and the second pressure vessel.

In the method for cleaning a reverse osmosis treatment device according to further embodiment, the cleaning is performed when increase in the pressure difference of the first pressure vessel or in the pressure difference of the second pressure vessel reaches the range of 5% or more and 40% or less compared to the pressure difference before the use of the first pressure vessel and the second pressure vessel. When the cleaning is performed after the pressure difference has increased to an excessively high level compared to the pressure difference before the use, life of the reverse osmosis membrane element will be shortened since recovery after the cleaning is insufficient while cleaning frequency is reduced. On the other hand, when the cleaning is performed at the timing when the pressure difference is still low compared to the pressure difference before use, the element will be sufficiently recovered while cleaning frequency will be higher. Accordingly, the cleaning is performed when increase in the pressure difference reaches the range of 5% or more and up to 40% or less compared to the pressure difference before the use of the pressure vessels.

Advantageous Effects of Invention

In the present invention, the pressure vessel is divided into two parts, namely, the first pressure vessel wherein the untreated water is primarily treated and the second pressure vessel wherein the water is secondarily treated, and therefore, a reagent suitable for cleaning the fouling of each of the first and second pressure vessels may be supplied to each vessel in the cleaning of these vessels. Accordingly, amount of the reagents used for the cleaning is reduced. Also, damages on the RO membranes by the reagent are suppressed by avoiding unnecessary cleaning, and these results in the prolonged life of the RO membrane.

BRIEF DESCRIPTION OF DRAWINGS

FIG. 10 is a table showing the opening/closing of the valves and operation of the pumps in the cleaning.

FIG. 13 shows examples of the reagent which can be used for the cleaning solution.

DESCRIPTION OF EMBODIMENTS

Next, preferred embodiments of the present invention are described in detail by referring to attached drawings. While the present invention is described by the following preferred embodiments, these embodiments may be modified by various means without deviating from the scope of the present invention, and embodiments other than these embodiments may also be used. Accordingly, all modifications within the scope of the present invention are within the scope of the claims of the present invention.

Figure 1:
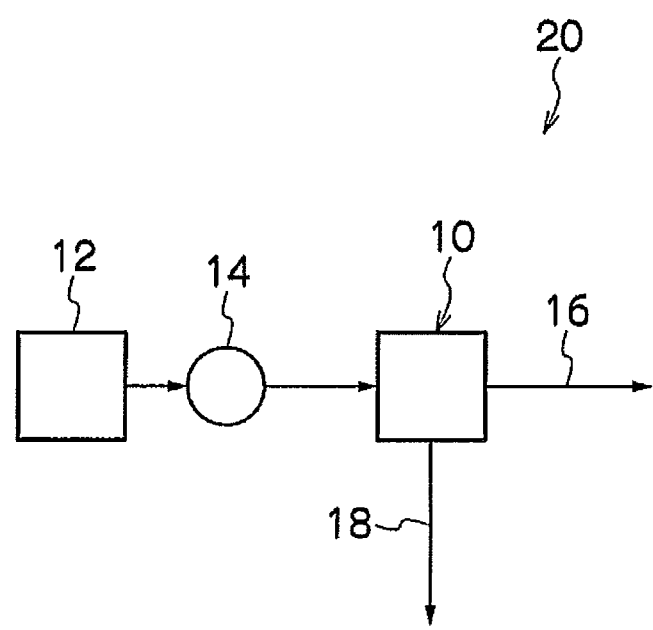
FIG. 1 is a block diagram wherein the reverse osmosis treatment device according to an embodiment is installed in a desalination system.

FIG. 1 is a block diagram of a desalination system 20 incorporating a reverse osmosis treatment device 10 according to an embodiment of the present invention. The desalination system of the present invention may be used in a system wherein untreated water is treated by reverse osmosis, for example, in reuse of waste water, production of purified water, desalination of brine, and desalination of sea water.

The desalination system 20 shown in FIG. 1 includes a tank 12 storing the untreated water, a high pressure pump 14, and a reverse osmosis treatment device 10. The untreated water in the tank 12 is supplied to the reverse osmosis treatment device 10 by the high pressure pump 14, and the water is treated by reverse osmosis (desalination) through the RO membranes (reverse osmosis membranes) in the reverse osmosis treatment device 10 to be separated into the desalinated permeate water (separated water) 16 and concentrated water (untreated water) 18 containing the concentrated salt content. The resulting permeated water 16 is discharged outside from the reverse osmosis treatment device 10 through an outlet pipe while the concentrated water 18 is also discharged outside from the reverse osmosis treatment device 10 through an outlet pipe which is different from the outlet pipe used for the discharging of the permeated water. In the desalination system 20 of this embodiment, the untreated water is supplied to the reverse osmosis treatment device 10 at a high pressure by the high pressure pump 14. The pressure in the reverse osmosis treatment device 10 is controlled by a valve with the opening degree, the valve being provided on the side of the concentrated water of the reverse osmosis treatment device 10.

The untreated water in the tank 12 may be raw water with no further treatment. However, the untreated water in the tank 12 may be the one which has undergone a pretreatment to remove turbidity components in the raw water. Exemplary such pretreatments include filtration and use of a settling reservoir in which the raw water is introduced and an antimicrobial such as chlorine is added for sterilization of microorganisms and removal by precipitation of the particles. Alternatively, the untreated water in the tank 12 may be the one pretreated by adding a flocculant such as iron chloride to the raw water for aggregation of the turbidity components and removal of the aggregates by filtration.

Figure 2:
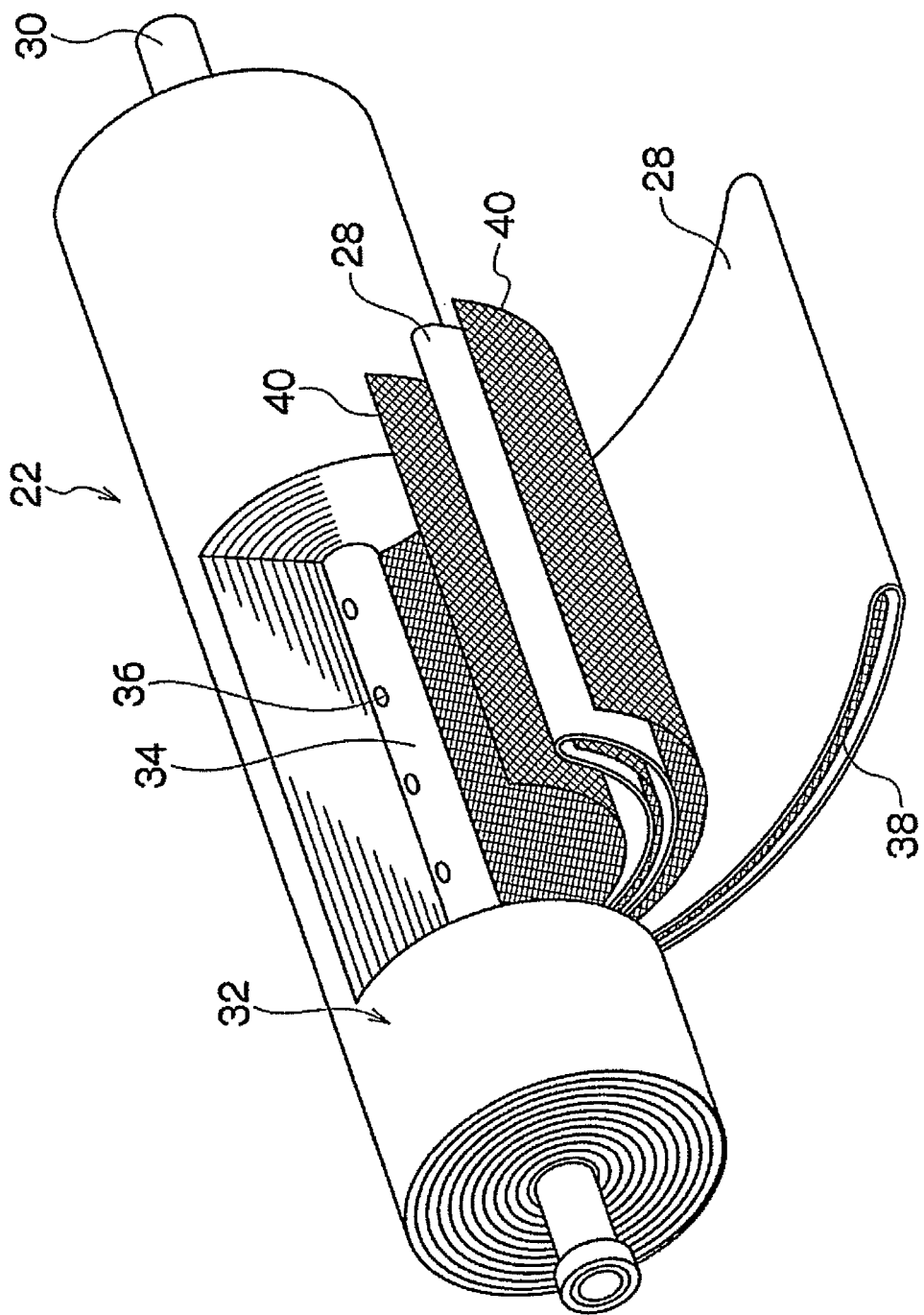
FIG. 2 is a perspective view of an element of the reverse osmosis treatment device according to the embodiment.
Figure 5:
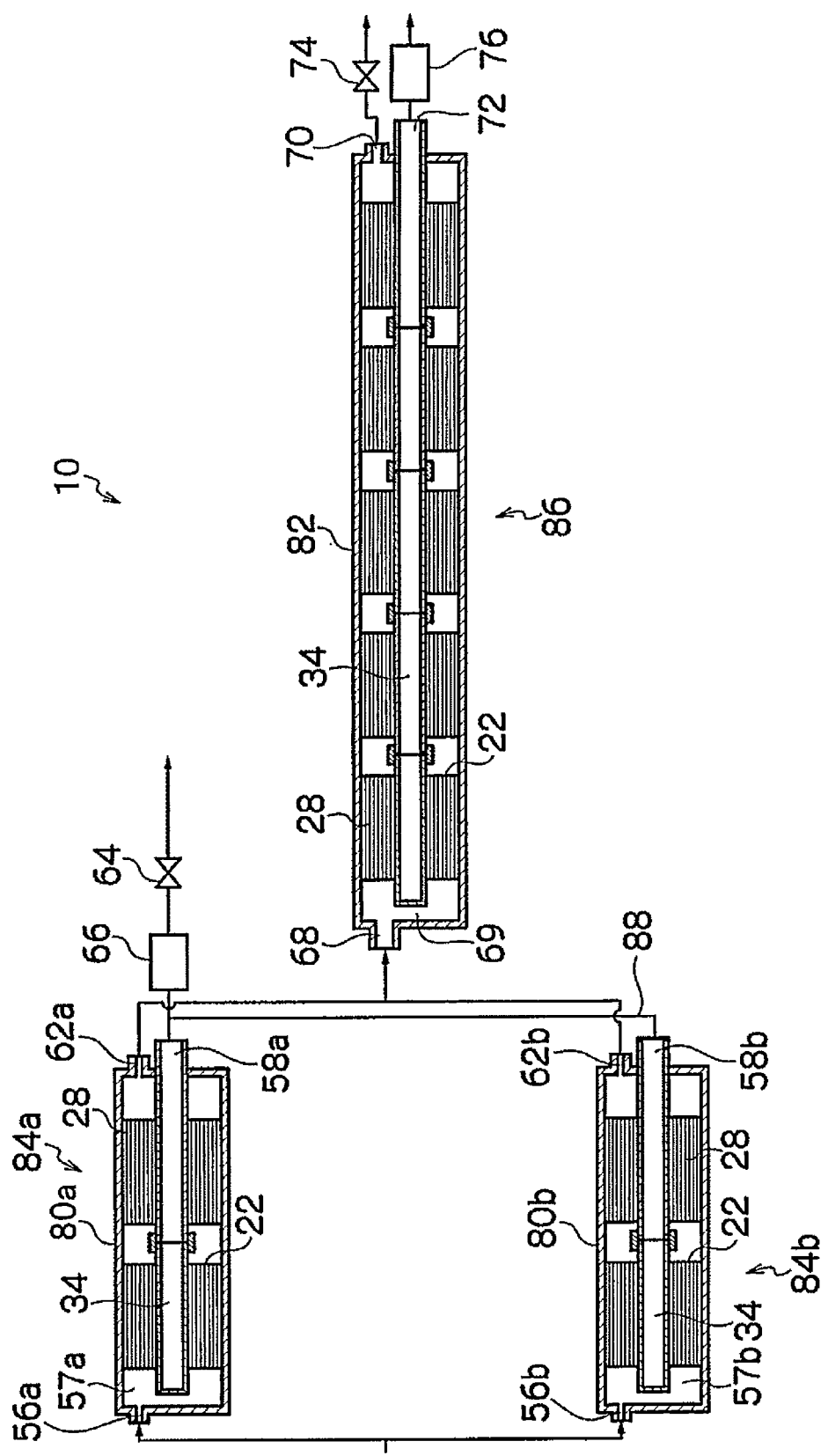
FIG. 5 is a cross sectional view schematically showing the reverse osmosis treatment device.

The reverse osmosis treatment device 10 is prepared by accommodating one element 22 or two or more serially connected elements 22 of FIG. 2 in cylindrical first vessels 80a and 80b and a second vessel 82 shown in FIG. 5 to constitute first modules 84a and 84b and a second module 86, and by using a unit of these first modules 84a and 84b and the second module 86 solely or two or more these units connected in parallel.

Figure 3:
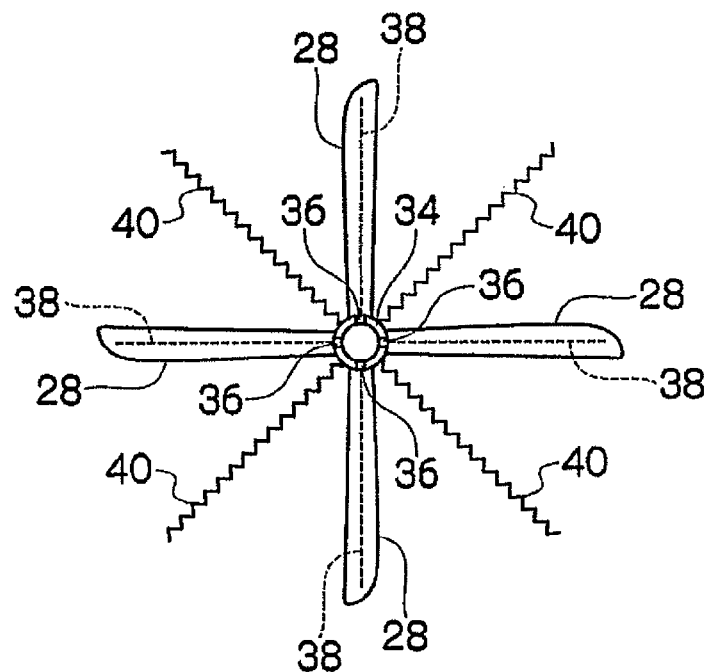
FIG. 3 is a front elevational view of the element shown in FIG. 2 before winding the RO membranes.
Figure 4:
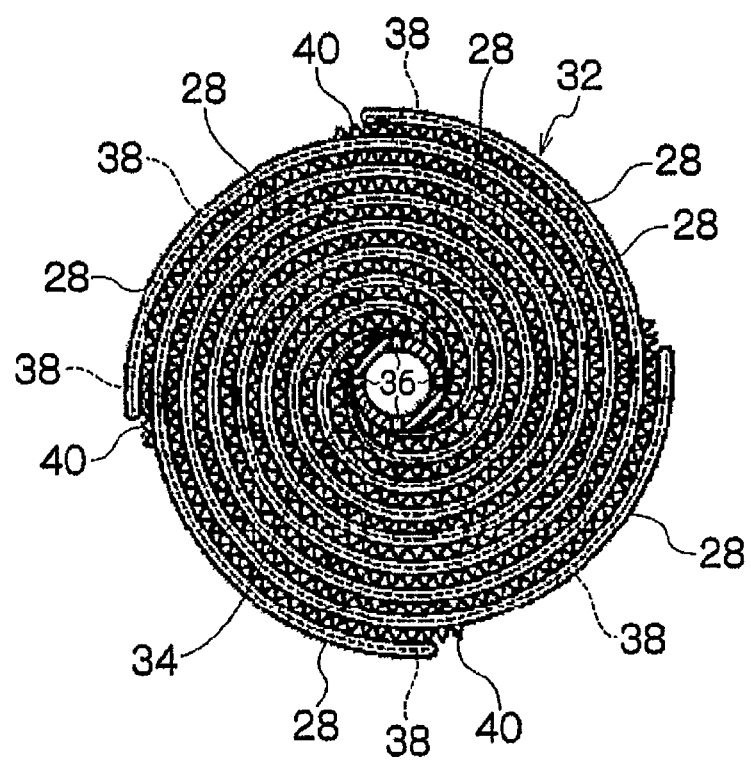
FIG. 4 is a front elevational view of the element shown in FIG. 2.

As shown in FIG. 2, the element 22 has, around a water collection pipe 34, a membrane unit 32 including an RO membrane 28 and an outlet pipe 30. The membrane unit 32 includes 4 pouch-shaped RO membranes 28 connecting radially to the periphery of the water collection pipe 34 as shown in FIG. 3. The RO membranes 28 are wound spirally around the periphery of the water collection pipe 34 as shown in FIG. 4. The pouch-shaped RO membrane 28 is open at one end, and the RO membrane 28 is adhered to the water collection pipe 34 at this open end, with the opening communicating with through-holes 36 of the water collection pipe 34 as shown in FIG. 3. The untreated water flows over the outer surface of the RO membrane 28, and the untreated water is desalinated while passing through the RO membrane 28. The desalinated permeate water after passing through the RO membrane 28 moves along the interior of the RO membrane 28 to the opening of the RO membrane 28 and further through the through hole 36 to be collected to the interior of the water collection pipe 34. The water collected in the water collection pipe 34 flows out of the element 22 from the outlet pipe 30. In FIG. 3, reference numeral 38 is a mesh spacer provided in the interior of the RO membrane 28, and this spacer keeps the interior space of the RO membrane 28 being wound around the water collection pipe 34, not to be reduced. Reference numeral 40 is a mesh spacer provided between the neighboring RO membranes 28 and 28. The spacer 40 also adheres radially to the periphery of the water collection pipe 34 as in the case of the RO membrane 28.

FIG. 5 is a cross sectional view of the reverse osmosis treatment device 10 according to an embodiment of the present invention. In this embodiment, the first modules 84a and 84b each including two serially connected elements 22 which perform the primary treatment are respectively accommodated in the first vessels 80a and 80b, and the second module 86 including five serially connected elements 22 which performs the secondary treatment is accommodated in the second vessel 82. With regard to the amount of the permeated water, a relatively large amount of water is treated in the first vessels 80a and 80b, and a relatively small amount of first concentrate remains after passing through the first vessels 80a and 80b. As shown in FIG. 5, an efficient treatment is enabled by supplying the first concentrated water from the two or more first vessels to the second vessel 82. While two first vessels 80a and 80b are shown in FIG.

5, number of the first vessels is not particularly limited, and either one vessel or three or more vessels may be used. Also, number of the second vessel is not limited to one, and use of two or more vessel is also acceptable.

The first vessels 80a and 80b are open at both ends for introducing the untreated water and for discharging the first concentrated water (primarily treated water) which failed to be treated in the first vessel 80. The second vessel 82 are also open at both ends for introducing the concentrated water (primarily treated water) discharged from the first vessels 80a and 80b and for discharging the second concentrated water (secondarily treated water) which failed to be treated in the second vessel 82. A predetermined pressure is applied to opening in the inlet side of the first vessels 80a and 80b by the high pressure pump 14. The first vessels 80a and 80b and the second vessel 82 may be formed from an FRP so that the vessels can endure the high pressure (5 MPa or higher). Also, the first vessels 80 and the second vessel 82 may be connected by a pipe formed from a material which can endure the high pressure.

In the following, the first vessel is described by referring to the first vessel 80a since the first vessels 80a and 80b have similar constitution. As shown in FIG. 5, the first vessel 80a has an untreated water inlet pipe 56a for introducing the untreated water into the first vessel 80a. The first vessel 80a has a first concentrate outlet pipe 62a for discharging the first concentrated water which is the remaining untreated water which did not permeate into the water collection pipe 34. The water after passing successively through the RO membranes 28 is collected in the water collection pipe 34 to be discharged from the first vessel 80a from a first outlet pipe 58a provided on the side of the first concentrate outlet pipe 62a. Measuring equipment 66 and a first valve 64 are provided at the exit of the first outlet pipe 58a. As shown in FIG. 5, the permeated water discharged from the first vessel joins with the permeated water from another first vessel 80b in the pipe 88 before reaching the measuring equipment 66 and being discharged from the device. Alternatively, the measuring equipment and the first valve may be provided to each first vessel, and the permeated water may be discharged without joining with the permeated water from other vessel.

The second vessel 82 includes the inlet pipe for the primarily treated water 68 which introduces the first concentrated water discharged from the first vessel 80a into the second vessel 82. The second vessel 82 includes the second concentrate outlet pipe 70 which discharges the second concentrate water which does not pass into the water collection pipe 34. A second valve 74 is provided at the exit of the second concentrate outlet pipe 70 for regulating the pressure in the second vessel 82. The permeated water after passing through the RO membrane 28 is collected into the water collection pipe 34 to be discharged from the second vessel 82 through the second outlet pipe 72 provided on the side of the second concentrate outlet pipe 70. Measuring equipment 76 is provided at the exit of the second outlet pipe 72. While the single second vessel is used in the embodiment shown in FIG. 5, two or more second vessels may be provided in the device. In such case, the permeated water discharged from the second vessel may join with the permeated water discharged from other second vessels before the measuring equipment 76, or alternatively, the measuring equipment may be provided with each second vessel and the permeated water may be directly discharged without joining with the permeated water discharged from other second vessels.

In the reverse osmosis treatment device 10, the water supplied from the tank 12 of FIG. 1 through the untreated water inlet pipe 56a is guided to the element 22 through the flow path 57a, and the untreated water passes successively through the RO membranes 28 of the element 22 to be collected into the water collection pipe 34. In this embodiment, the reverse osmosis treatment is performed in two stages, namely, in the first vessel 80a and in the second vessel 82. The permeated water treated in the first vessel 80a is discharged from the first vessel 80a through the first outlet pipe 58a. The first concentration water without passing into the water collection pipe 34 is discharged from the first concentration outlet pipe 62a, and supplied to the inlet pipe for the primarily treated water 68 of the second vessel 82 to be guided to the element 22 through the flow path 69. After passing through successively the RO membranes 28, the water is collected into water collection pipe 34. The permeated water which has been treated in the second vessel 82 is then discharged from the second vessel 82 through the second outlet pipe 72. The remaining second concentrate water without passing into the collection pipe 34 is discharged from the second concentrate outlet pipe 70.

Figure 6:
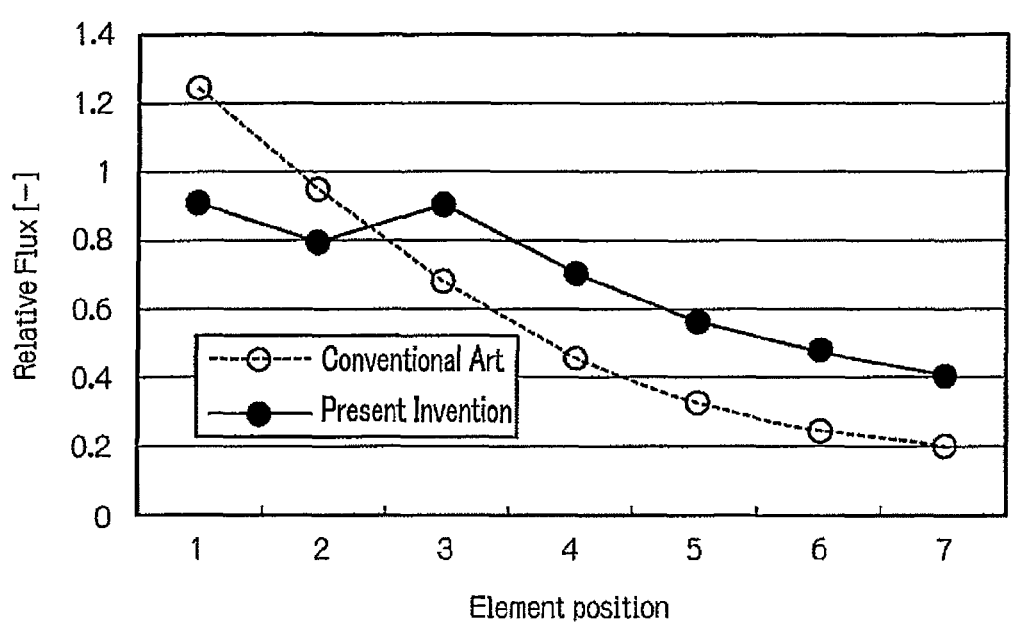
FIG. 6 is a graph showing relative flux of the permeated water in relation to the position of the RO membrane element in the reverse osmosis treatment device according to an embodiment.

FIG. 6 is a graph showing relative flux of the permeated water in relation to the position of the RO membrane element in the reverse osmosis treatment device according to the embodiment. The data of the present invention is the one obtained in the experiment wherein two elements are provided in the first vessel (element position Nos. 1 and 2 in the horizontal axis of FIG. 6) and five elements are provided in the second vessel (element position Nos. 3 to 7 in the horizontal axis of FIG. 6). In the conventional device, a large amount of water permeated was produced on the side of the feedwater inlet, and the amount of the water permeated was smaller toward the side of the concentrate water outlet side. This is because the pressure applied to the vessel had to be determined by the pressure applied to the element at the final stage. In contrast, in the present invention, the pressure in the first vessel 80a is regulated by the first valve 64, and as shown in FIG. 6, the relative flux is adjusted to the desired value so that the amount of the water permeated is reduced. Since the amount of the water permeated in the first vessel 80a is reduced and the first concentrate water has been reduced in salt concentration, the water permeated in the second vessel 82 is increased as demonstrated at element positions 3 to 7 of FIG. 6. As a consequence, ununiformity in the amount of water permeated in each RO membrane element is removed, and increase in the amount of the water permeated in the entire device is thereby realized.

A flow rate in the first vessel 80a may be regulated by adjusting the opening degree of the first valve 64 based on the measurement of the measuring equipment 66. A flow rate of the permeated water in the second vessel 82 may be regulated by adjusting the degree of opening of the second valve 74 based on the measurement of the measuring equipment 76. The flow rate of the permeated water may also be regulated by adjusting the high pressure pump 14 based on the measurement value of the pressure gauge provided between the high pressure pump 14 and the reverse osmosis treatment device 10. Examples of the measuring equipments 66 and 76 include a flow meter, a pressure gauge, and an electric conductivity meter. The variation in salt rejection (concentration) is obtained by the measurement of the electric conductivity, and amount of the permeated water is confirmed by monitoring the rejection rate for salt (concentration).

While the number of the elements 22 in the embodiment of FIG. 5 is two in the first vessel 80a and 5 in the second vessel 82, the number of elements provided is not limited to such embodiment. However, the number of elements 22 in the first vessel 80*a* may be the same or smaller the number of elements 22 in the second vessel 82.

Figure 7:
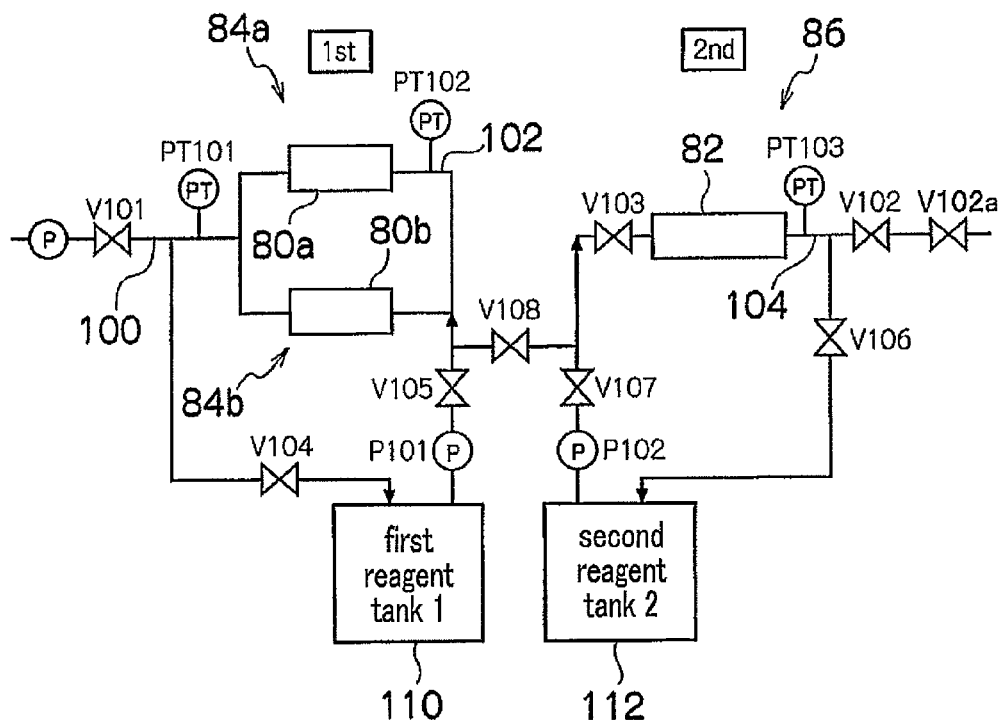
FIG. 7 is a view for explaining the flow of the cleaning solution.
Figure 8:
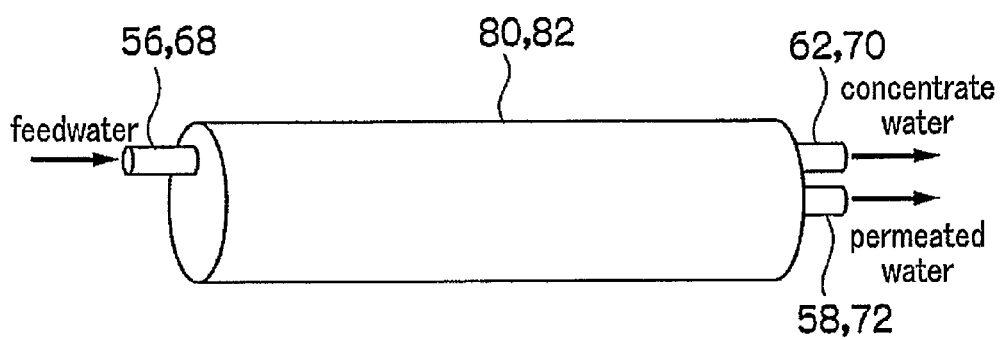
FIG. 8 is an exterior view showing an end port vessel.
Figure 9:
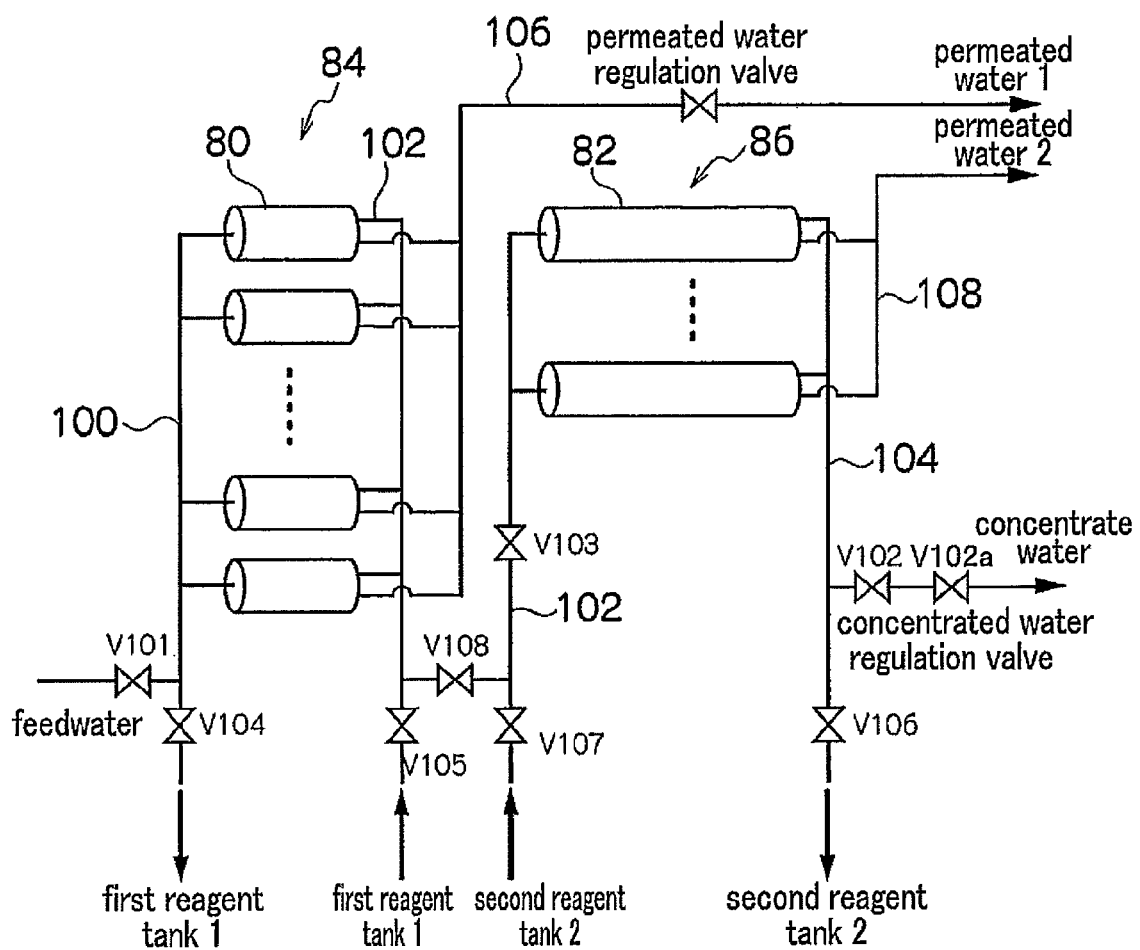
FIG. 9 is a piping diagram when an end port vessel is used.
Figure 11:
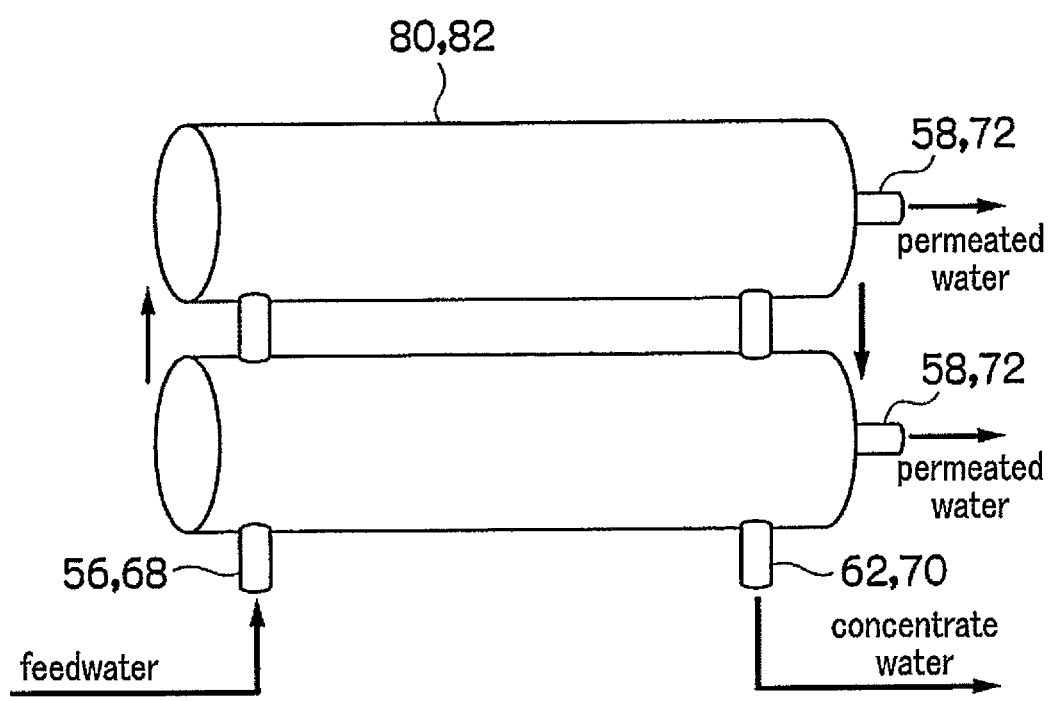
FIG. 11 is an exterior view showing a side port vessel.
Figure 12:
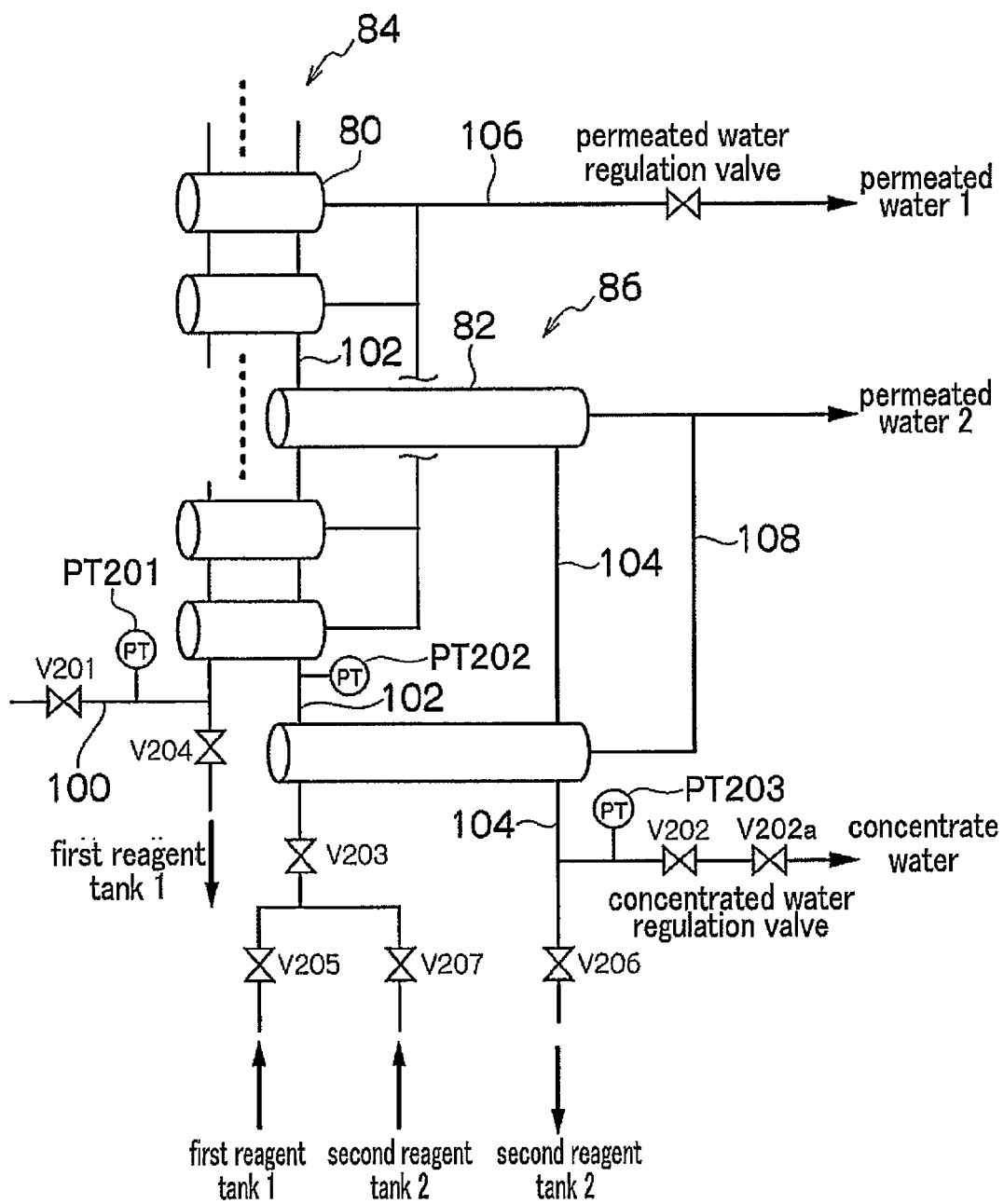
FIG. 12 is a piping diagram when a side port vessel is used.

Next, the method for cleaning the reverse osmosis treatment device 10 is described by referring to FIGS. 7 to 12. FIG. 7 is a view for explaining the flow of the cleaning solution, FIG. 8 is an exterior view showing an end port vessel, FIG. 9 is a piping diagram when an end port vessel is used, FIG. 10 is a table showing the opening/closing of the valves and operation of the pumps in the cleaning, FIG. 11 is an exterior view showing a side port vessel, and FIG. 12 is a piping diagram when a side port vessel is used.

In the reverse osmosis treatment device 10, foulings from the organic and microbial content in the untreated water are deposited in the pressure vessel at the start of the treatment, namely, in the upstream side of the vessel. In contrast, the water is concentrated in the downstream side of the pressure vessel, and inorganic substances have a tendency to be precipitated, namely, inorganic fouling has a tendency to be deposited in the downstream side of the vessel. In the embodiments of the present invention, treatment of the untreated water is accomplished by dividing the pressure vessels into two stages so that organic and microbial foulings are deposited in the first vessels 80*a* and 80*b* and inorganic foulings are deposited in the second vessel 82. Accordingly, cleaning of the RO membrane element is accomplished by using a reagent capable of removing the organic and microbial foulings for the cleaning solution in the first vessels 80*a* and 80*b*, and a reagent capable of removing the inorganic foulings for the a cleaning solution in the second vessel 82. Since the pressure vessels are divided into two stages, both the first vessels 80*a* and 80*b* and the second vessel 82 are shorter compared to the case wherein the treatment is completed in one vessel, and reagents suitable for each vessel can be used for the cleaning solution thereby enabling reduction in the amount of the cleaning solution used.

The cleaning solution is supplied to the first vessel 80*a* from the first concentrate outlet pipe 62*a* through the pipe for primarily treated water 102. The cleaning solution used for cleaning the first vessel 80*a* is discharged from the untreated water inlet pipe 56*a*, and returned to the first reagent tank 110 through the untreated water pipe 100. In the first vessel 80*a*, more organic and microbial foulings tend to be deposited in the upstream side as described above, and therefore, the cleaning solution is supplied from the first concentrate outlet pipe 62*a* and discharged from the untreated water inlet pipe 56*a* to thereby discharge the foulings which deposited on the RO membrane element without passing through the first vessel 80*a*. This enables prevention of the contamination of the interior of the first vessel 80*a* by the foulings removed by the cleaning solution.

On the contrary, the cleaning solution is supplied to the second vessel 82 from the pipe for primarily treated water 102 and the inlet pipe for the primarily treated water 68. The cleaning solution used for the cleaning of the second vessel 82 is discharged from the second concentrate outlet pipe 70, and returned to the reagent tank through the pipe for secondarily treated water 104. In the second vessel 82, the inorganic fouling is deposited in the downstream side of the second vessel 82, and therefore, the cleaning solution is supplied from the inlet pipe for the primarily treated water 68 to thereby prevent passing of the inorganic fouling through the second vessel 82 and contamination of the interior of the second vessel 82 by the fouling removed by the cleaning solution.

Next, a pipe structure of the reverse osmosis treatment device and the cleaning device using an end port vessel is described by referring to FIGS. 8 and 9. As shown in FIG. 8, in the case of the end port vessel, the untreated water is supplied from the untreated water inlet pipe 56 or the inlet pipe for the primarily treated water 68 provided at one end of the first vessel 80 or the second vessel 82, and the permeated water is discharged from the first outlet pipe 58 or second outlet pipe 72 provided on the other end of the first vessel 80. Also, the concentrate water is discharged from the first concentrate outlet pipe 62 or the second concentrate outlet pipe 70 provided in the cylindrical vessel in the direction parallel to the flow of the untreated water. In the case of the end port vessel, the untreated water is supplied to each of the first vessels 80 through the untreated water pipe 100 as shown in FIG. 9. The concentrate water discharged from the first vessel 80 is also collected through the common pipe for primarily treated water 102 to be supplied into the second vessel 82. The concentrate water discharged from the second vessel is also collected through the common pipe for secondarily treated water 104 to be discharged. With regard to the permeated water, the permeated water discharged from the first vessel 80 is collected through the first permeate pipe 106, and the permeated water discharged from the second vessel 82 is collected through the second permeate pipe 108 to be discharged.

The cleaning of the vessels may be accomplished by supplying the cleaning solution into the pipe for primarily treated water 102 between the first vessel 80 and the second vessel 82 as shown in FIG. 9. When the first vessel is cleaned, the cleaning solution is supplied from the first reagent tank 110 through the pipe for primarily treated water 102 to the first concentrate outlet pipe 62 of the first vessel 80. The discharge solution from the first vessel 80 passes through the untreated water inlet pipe 56 provided for supplying the untreated water, and then returned to the first reagent tank 110. When the second vessel 82 is cleaned, the cleaning solution is supplied from the second reagent tank 112 through the pipe for primarily treated water 102 to the inlet pipe for the primarily treated water 68 of the second vessel 82. The discharge solution from the second vessel 82 passes through the second concentrate outlet pipe 70 and the pipe for secondarily treated water 104, and then returned to the second reagent tank 112.

FIG. 10 is a table showing the opening/closing of the valves and operation of the pumps in the cleaning. When the first vessel 80 is cleaned by the cleaning solution stored in the first reagent tank 110, the cleaning solution is circulated in the first vessel 80 by opening the valves V104 and V105, closing other valves, and operating the pump P101. When the second vessel 82 is cleaned by the cleaning solution stored in the second reagent tank 112, the cleaning solution is circulated in the second vessel 82 by opening the valves V103, V106, and V107, closing other valves, and operating the pump P102. Alternatively, the first vessel 80 and the second vessel 82 may be simultaneously cleaned, and in this case, the valves V103, V104, V105, V106, and V107 may be opened, and the pumps P101 and P102 are operated to clean the first vessel 80 and the second vessel 82. Since the valve V102 is the valve for adjusting the pressure in the second vessel 82 (namely, the second valve 74 in FIG. 5), full closure and full opening of the valve V102 is not preferable. Accordingly, valves V102*a* and V202*a* may be provided respectively in the downstream of the valves V102 and V202 as shown in FIGS. 7, 9, and 12 to regulate the flow of the cleaning solution.

Next, pipe structure of the reverse osmosis treatment device and the cleaning device using a side port vessel is described by referring to FIGS. 11 and 12. As shown in FIG.

11, in the case of the side port vessel, the untreated water is supplied from the untreated water inlet pipe 56 or the inlet pipe for the primarily treated water 68 provided on the side surface at one end of the first vessel 80 or the second vessel 82, and the permeated water is discharged from the first outlet pipe 58 or second outlet pipe 72 provided on the other end of the first vessel 80. Also, the concentrate water is discharged from the concentrate outlet pipe provided on the side surface at the other end. In the case of the side port vessel, since the untreated water inlet pipe 56, the inlet pipe for the primarily treated water 68, and the first concentrate outlet pipe 62, second concentrate outlet pipe 70 are provided on the side surface of the vessel, the first vessels 80 and the second vessels 82 are respectively connected in parallel, and the supply of the untreated water and the discharge of the concentrate water are accomplished by passing through other vessels which are connected in parallel.

The first reagent tank 110 and the second reagent tank 112 are connected to the pipe for primarily treated water 102 connecting the first concentrate outlet pipe 62 of the first vessel 80 and the inlet pipe for the primarily treated water 68 of the second vessel 82 so that the cleaning solution is supplied to the pipe for primarily treated water 102. In cleaning the vessel, cleaning of the first vessel is performed by circulating the cleaning solution through the first vessel 80 by closing the valve V206 of the pipe connecting the second reagent tank 112 on the concentrate water-discharging side of the of the second vessel, opening the valve V204 connecting the first reagent tank 110 on the untreated water-supplying side of the first vessel, and opening the valves V203 and V205 on the cleaning water-supplying side. When the cleaning solution is supplied to the first vessels 80 connected in parallel, the cleaning solution may pass through the second vessel 82, and no particular effects are generated since the cleaning solution only passes through the second vessel 82. The cleaning solution may be circulated through the second vessel 82 by closing the valve V204 connecting the first reagent tank 110 on the side of the untreated water-supplying side of the first vessel, opening the valve V206 in the pipe connecting the second reagent tank 112 on the concentrated water-discharging side of the second vessel, and opening the valves V203 and V207 on the cleaning solution-supplying side.

The timings for the cleaning of the vessels are determined by the pressure differences between the pressure gauges at the untreated water pipe 100, at the pipe for primarily treated water 102 and at the pipe for secondarily treated water 104, respectively. More specifically, the values of the pressure gauges are continuously monitored, and the vessel is cleaned when the pressure difference reached the predetermined range compared to the initial value, and preferably, when the pressure difference reached 5 to 40% of the initial value. When the cleaning is performed at a higher pressure difference compared to the initial value, the time until the first cleaning can be extended while recovery after the cleaning is reduced and the overall life is reduced. On the other hand, when the cleaning is performed at a lower pressure difference compared to the initial value, the membrane may be used for a longer period while frequency of the cleaning is increased. The timing for the cleaning may be adequately set depending on the application of the membrane. When the fouling of the vessel is confirmed by using pressure gauges as described above, the reagent required for the cleaning is supplied at the required timing, to the required site, and at a minimized amount, and the cost of the reagent in the cleaning solution can be greatly reduced.

After the cleaning, the step of rinsing is performed for rinsing the cleaning solution. In the rinsing step, the rinse solution may be supplied through a flow path which is the same as the one used for the cleaning solution. The solution used for the rinsing step may be the permeated water produced by the reverse osmosis treatment device. Alternatively, the untreated water may be used for the rinsing. The rinse solution may be supplied to the vessel by using the same tank as the one used for the cleaning solution. Alternatively, the rinse solution may be supplied by providing an additional tank (not shown) for the rinse solution.

Completion of the cleaning may be confirmed by supplying the untreated water or the rinse solution and confirming decrease in the pressure difference by using the pressure gauges. Alternatively, the completion may be confirmed by operating the device at the flow rate the same as the actual operation with the vessel filled with the cleaning solution, and confirming the pressure difference. This enables prevention of the loss of reagents and time used for the replacement. With regard to the flowing of the cleaning solution to the side of the filtrate, quality of the permeated water is not affected despite change in the pH since the RO membrane element can eliminate ions.

In addition to the confirmation by the pressure difference between the pressure gauges, completion of the cleaning may be confirmed by checking the cleaning solution discharged from the first vessel in the case of organic or microbial fouling. In the case of the organic fouling, the cleaning solution is colored by the component in the fouling, and the completion of the cleaning may be confirmed by using chromaticity or absorbance. In the case of microbial fouling, the confirmation may be accomplished by further measuring turbidity. In the case of the inorganic substance, confirmation may be accomplished by measuring electric conductivity. Since the cleaning is performed by circulating the reagent by using the reagent tank, the completion may be monitored, for example, by (1) monitoring change in the quality of the cleaning solution from the RO membrane and judging the completion of the cleaning when the change in the quality is flat (within predetermined range), or (2) conducting the cleaning by circulating the cleaning solution for a predetermined time, and confirming the quality of the cleaning solution at the exit of the RO membrane by introducing the fresh cleaning solution and judging the completion when no abnormality is detected.

FIG. 13 shows examples of the reagent which can be used for the cleaning solution. Examples of the reagent which may be used for the removal of organic fouling include an alkali such as sodium hydroxide (NaOH), and chelating agent such as EDTA (ethylenediaminetetraacetic acid), and examples of the reagent which may be used for the removal of inorganic fouling include acids such as citric acid, phosphoric acid, and hydrochloric acid.

Figure 14:
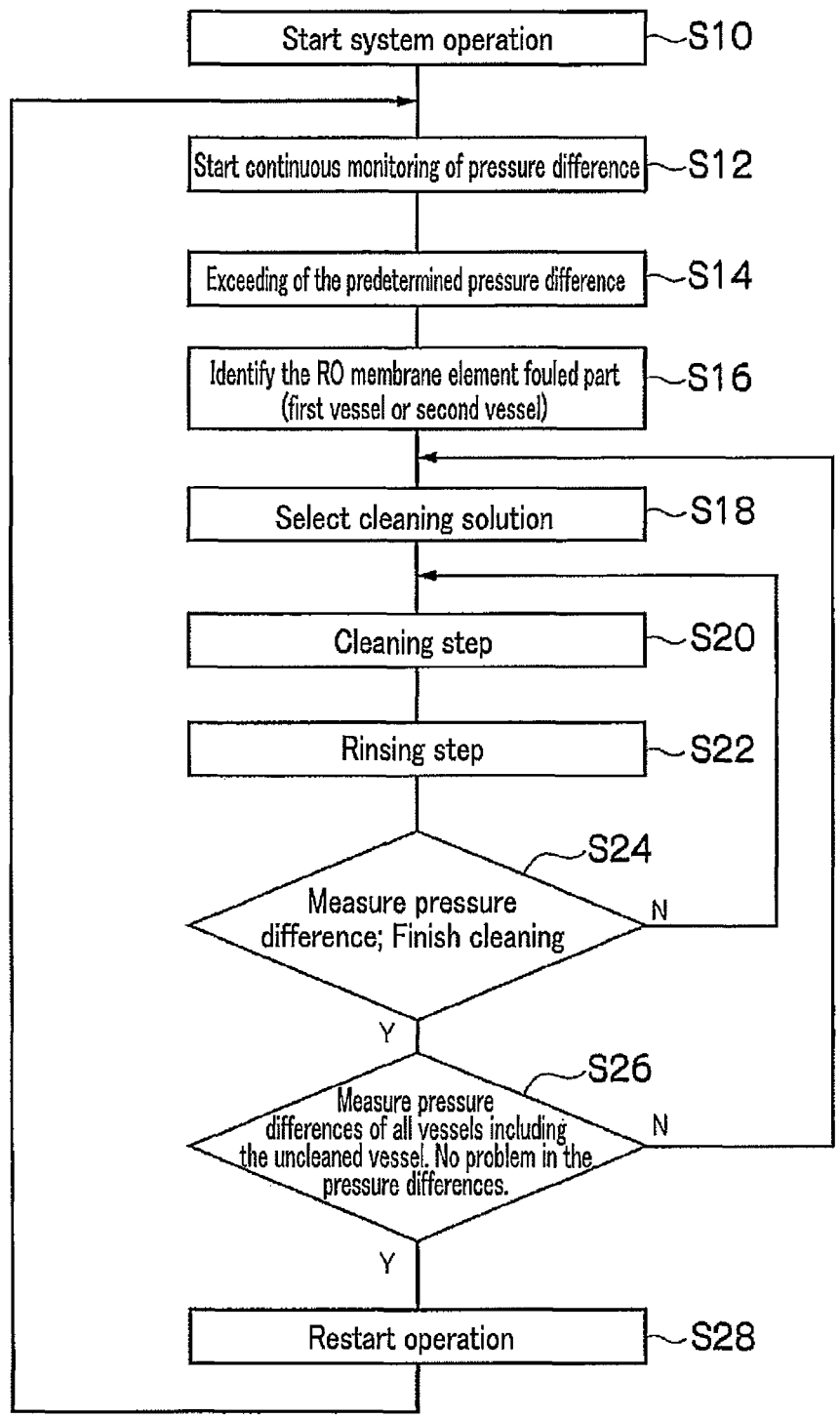
FIG. 14 is a flow chart showing a method for cleaning the reverse osmosis treatment device.
Figure 15:
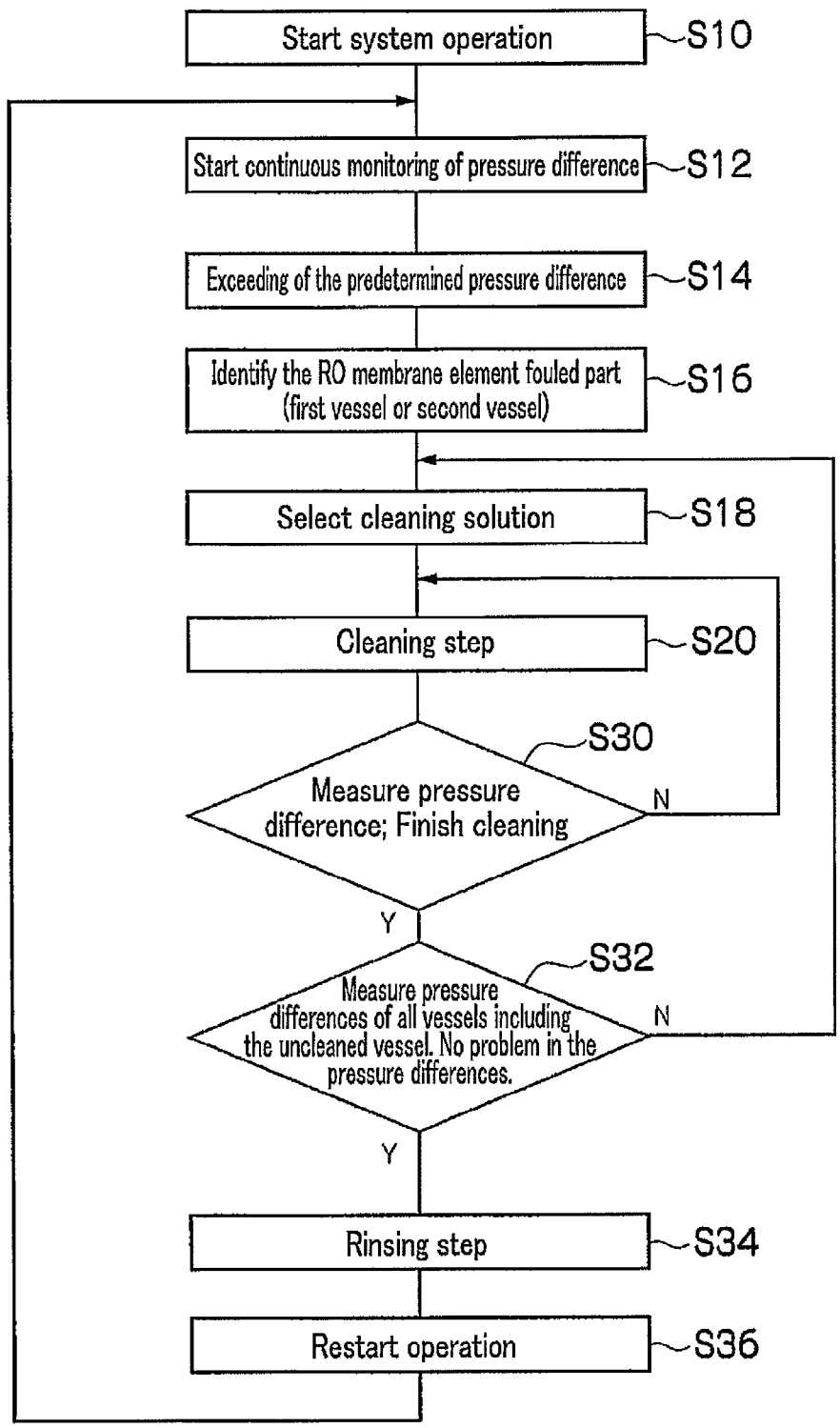
FIG. 15 is a flow chart showing another method for cleaning the reverse osmosis treatment device.
Figure 16:
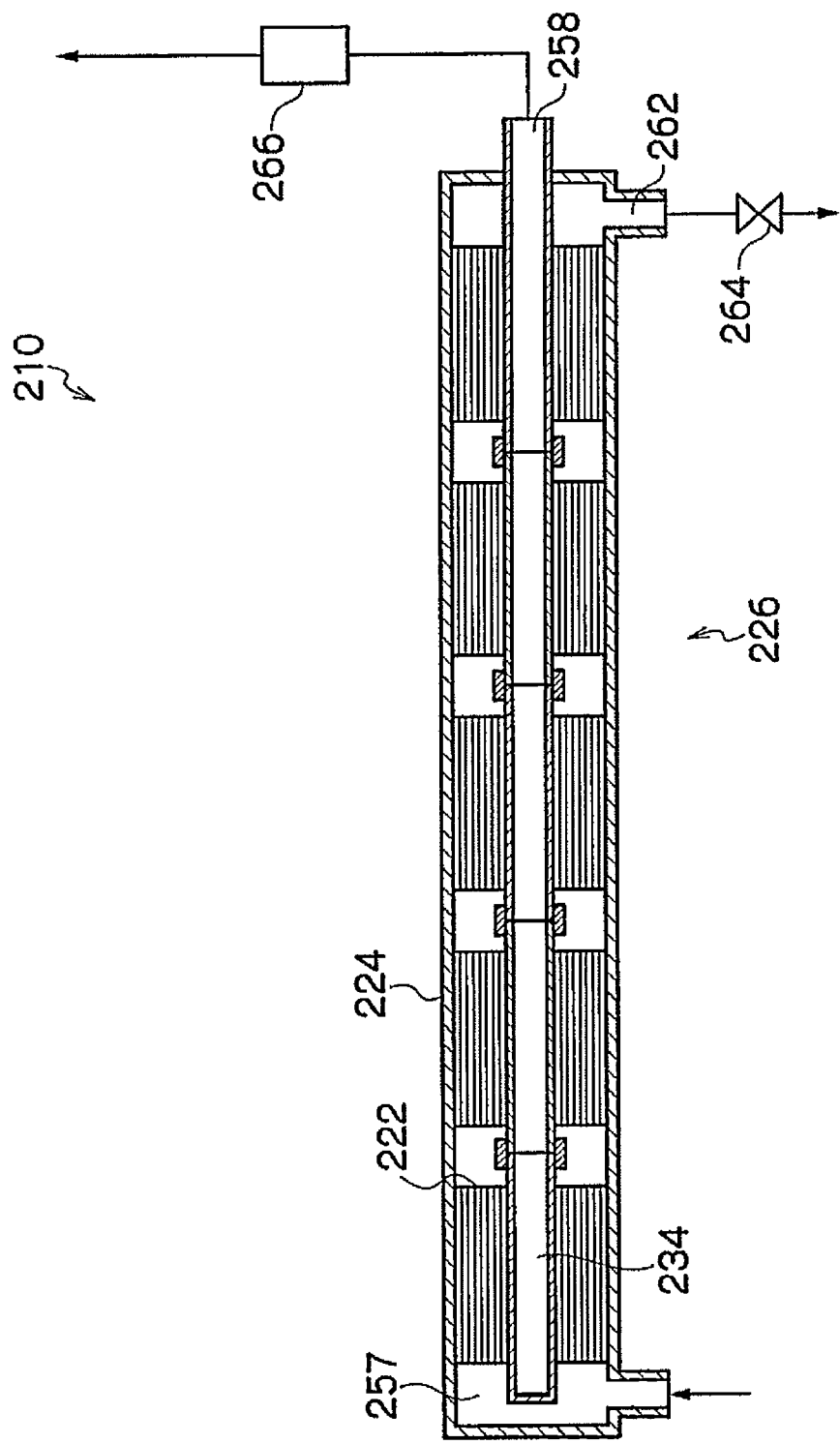
FIG. 16 is a cross sectional view schematically showing the conventional reverse osmosis treatment device.
Figure 17:
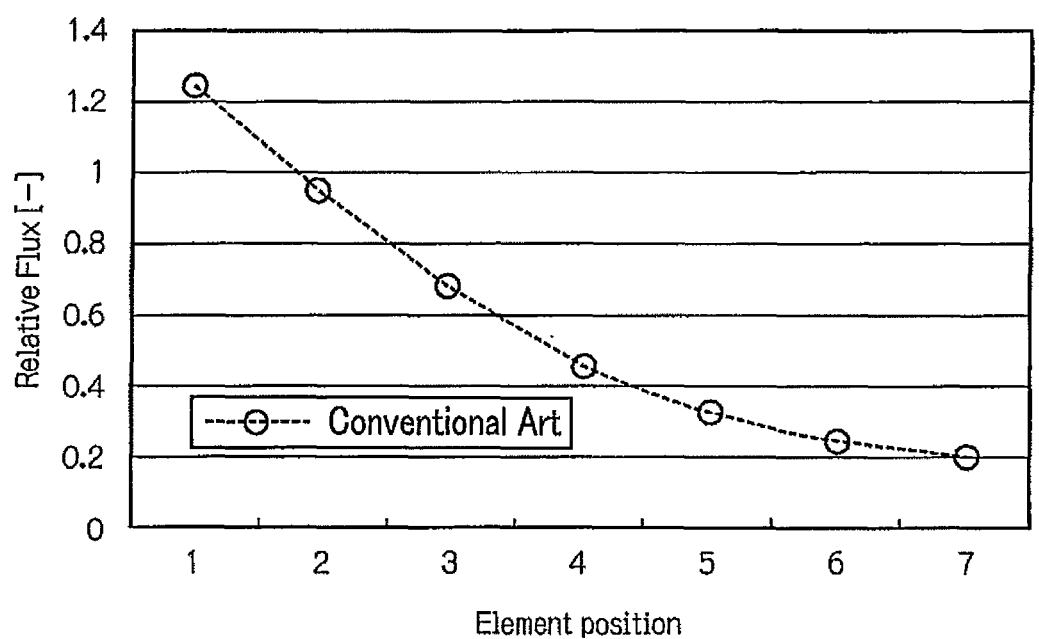
FIG. 17 is a graph showing relative flux of the permeated water in relation to the position of the RO membrane element in the conventional reverse osmosis treatment device.

Next, the cleaning method is described by referring to FIGS. 14 and 15. As shown in FIG. 14, the operation of the system of the reverse osmosis treatment device 10 is started (step S10). During the operation of the reverse osmosis treatment device 10, pressure differences are continuously monitored by using the pressure gauges PT101, PT102 and PT103 (shown in FIG. 7) provided at the untreated water pipe 100, the pipe for primarily treated water 102, and the pipe for secondarily treated water 104 (step S12). When a pressure difference monitored by the pressure gauges PT101, PT102 and PT103 exceeds the predetermined value (step S14), the site of fouling in the RO membrane element is determined by using the pressure difference (step S16). More specifically, the first vessel is cleaned when the pressure difference between the pressure gauge PT101 (shown in FIG. 7) provided on the untreated water pipe 100 and the pressure gauge PT102 (shown in FIG. 7) provided on the pipe for primarily treated water 102 compared to the initial value exceeds the predetermined value, while the second vessel is cleaned when the pressure difference between the pressure gauges PT102 and PT103 provided on the pipe for primarily treated water 102 and the pipe for secondarily treated water 104 (shown in FIG. 7) exceeds the predetermined value compared to the initial value.

When the site of fouling is detected as the first vessel or the second vessel in the step S16, the reagent used for the cleaning of the first vessel or the second vessel is selected (step S18). Next, the cleaning step is performed (step S20). In the cleaning step, the cleaning is performed under the conditions of the valve opening and pump operation shown in FIG. 10. After the cleaning, the rinsing step is performed to rinse and remove the cleaning solution (step S22). In the rinsing step, quality of the rinse solution which has passed through the vessel is confirmed to thereby confirm the completion of the rinsing step. After the rinsing step, the permeated water (water product) produced in the reverse osmosis treatment device or the untreated water is allowed to flow in the same direction as the direction in the treatment of the untreated water to measure the pressure difference to thereby confirm the completion of the cleaning (step S24). When insufficiency in the cleaning of the vessel is detected in measuring the pressure difference, the cleaning is performed again by returning to the step S20. When the pressure difference of the cleaned vessel has recovered while the pressure difference is still found for the other vessel, reagent is selected by returning to the step S18 to thereby clean the other vessel (step S26). When sufficient cleaning is confirmed in the confirmation by the pressure difference in the step S24, operation of the reverse osmosis treatment device is restarted (step S28).

FIG. 15 is a flow chart showing another method of cleaning the reverse osmosis treatment device 10. The cleaning method of FIG. 15 is different from the cleaning method of FIG. 14 in that the cleaning solution is supplied in the post-cleaning measurement of the pressure difference for the measurement of the pressure difference.

In other words, the method may be performed by the same procedure as the one shown in FIG. 14 until the step S20. When the first vessel is cleaned during the post-cleaning measurement of the pressure difference, the pressure difference is confirmed by circulating the cleaning reagent in the direction and flow rate the same as those used in the treatment of the untreated water. When the second vessel is cleaned, the pressure difference is confirmed by using a flow rate the same as the used in the treatment of the untreated water (step S30). When insufficiency in the cleaning of the cleaned vessel is detected by the measurement of the pressure difference, cleaning is performed again by returning to the step S20. When the pressure difference of the cleaned vessel has recovered while a pressure difference is confirmed in another vessel (step S32), the cleaning solution is selected by returning to the step S18 to thereby perform the cleaning of the other vessel. When sufficient re-cleaning is confirmed, the rinsing step of rinsing and removing the cleaning solution is performed (step S34). The operation of the reverse osmosis treatment device is restarted after the completion of the rinsing step.

REFERENCE NUMERALS LIST

10: reverse osmosis treatment device, 12: tank, 14: high pressure pump, 16: permeated water, 18: concentrated water, 20: desalination system, 22: element, 28: RO membrane, 30: outlet pipe, 32: membrane unit, 34: water collection pipe, 36: pore, 38,40: spacer, 56: untreated water inlet pipe, 57: flow path, 58: first outlet pipe, 62: first concentrate outlet pipe, 64: first valve, 66, 76: measuring equipment, 68: inlet pipe for primarily treated water, 69: flow path, 70: second concentrate outlet pipe, 72: second outlet pipe, 74: second valve, 80,80a,80b: first vessel, 82: second vessel, 84: first module, 86: second module, 88: pipe, 100: pipe for untreated water, 102: pipe for primarily treated water, 104: pipe for secondarily treated water, 106: first permeate pipe, 108: second permeate pipe, 110: first reagent tank, 112: second reagent tank, PT101, PT102, PT103, PT201, PT202 and PT203: pressure gauge.

What is claimed is:

1. A reverse osmosis treatment device comprising:
   a first pressure vessel for primarily treating an untreated water to produce a primarily treated water and a first permeated water;
   a second pressure vessel for secondarily treating the primarily treated water to produce a secondarily treated water and a second permeated water;
   a first cleaning solution tank storing a first cleaning solution used for cleaning the first pressure vessel; and
   a second cleaning solution tank storing a second cleaning solution used for cleaning the second pressure vessel;
   wherein:
   the first cleaning solution is configured to remove organic and microbial foulings from the first pressure vessel,
   the second cleaning solution is configured to remove an inorganic fouling from the second pressure vessel,
   each of the first pressure vessel and the second pressure vessel includes therein a reverse osmosis membrane element including a reverse osmosis membrane or reverse osmosis membrane elements connected in series by a water collection tube through which flows permeated water that has passed through the reverse osmosis membrane elements,
   the first pressure vessel includes a first end provided with an untreated water inlet pipe for introducing the untreated water into the first pressure vessel,
   the first pressure vessel includes a second end provided with a first concentrate outlet pipe for discharging the primarily treated water from the first pressure vessel and a first outlet pipe for discharging the first permeated water from the first pressure vessel,
   the second pressure vessel includes a first end provided with an inlet pipe for the primarily treated water for introducing the primarily treated water into the second pressure vessel,
   the second pressure vessel includes a second end provided with a second concentrate outlet pipe for discharging the secondarily treated water from the second pressure vessel and a second outlet pipe for discharging the second permeated water from the second pressure vessel,
   the first cleaning solution tank is connected to the first concentrate outlet pipe of the first pressure vessel,
   the first cleaning solution is fed by a first pump into the first pressure vessel through the first concentrate outlet pipe to thereby remove the organic and microbial foulings from the first pressure vessel,
   the first cleaning solution is discharged from the untreated water inlet pipe through the first pressure vessel,
   the second cleaning solution tank is connected to the inlet pipe for the primarily treated water of the second pressure vessel, the second cleaning solution is fed by a second pump into the second pressure vessel through the inlet pipe for primarily treated water to thereby remove the inorganic fouling from the second pressure vessel, and the second cleaning solution is discharged from the second concentrate outlet pipe through the second pressure vessel.

2. The reverse osmosis treatment device according to claim 1, wherein:

the first cleaning solution tank is connected to the untreated water inlet pipe, and the first cleaning solution is made to flow from the first concentrate outlet pipe through the first pressure valve to the untreated water inlet pipe, the second cleaning solution tank is connected to the second concentrate outlet pipe, and the second cleaning solution is made to flow from the inlet pipe for primarily treated water through the second pressure vessel to the second concentrate outlet pipe.

3. The reverse osmosis treatment device according to claim 1 further comprising:

pressure gauges provided at an upstream side of the first pressure vessel for the untreated water and at a downstream side of the first pressure vessel for the primarily treated water, respectively;

pressure gauges provided at an upstream side of the second pressure vessel for the primarily treated water and at a downstream side of the second pressure vessel for the secondarily treated water, respectively, wherein:

a fouling of the first pressure vessel is detected by a pressure difference between the upstream side and the downstream side of the first pressure vessel, and a fouling of the second pressure vessel is detected by a pressure difference between the upstream side and the downstream side of the second pressure vessel.

4. The reverse osmosis treatment device according to claim 1, further comprising a rinse solution tank storing a rinse solution used for rinsing the first cleaning solution in the first pressure vessel and the second cleaning solution in the second pressure vessel.

5. The reverse osmosis treatment device according to claim 4, wherein the rinse solution includes the first permeated water, the second permeated water, or the untreated water.

6. A method for cleaning the reverse osmosis treatment device of claim 1, comprising the steps of:

providing the reverse osmosis treatment device of claim 1;

confirming a pressure difference of the first pressure vessel for primarily treating an untreated water by a first reverse osmosis membrane and a pressure difference of the second pressure vessel for secondarily treating by a second reverse osmosis membrane a primarily treated water which has been treated by the first reverse osmosis membrane, to thereby determine respective fouling of the first pressure vessel and the second pressure vessel;

determining a specified pressure vessel to be cleaned from the first pressure vessel and the second pressure vessel based on the pressure difference of the first pressure vessel and the pressure difference of the second pressure vessel;

selecting a cleaning solution containing a reagent depending on the specified pressure vessel having a fouling which has been identified in the step of confirming the pressure difference;

cleaning the first pressure vessel by feeding the first cleaning solution into the first pressure vessel through the first concentrate outlet pipe for discharging the primarily treated water from the first pressure vessel to thereby remove organic and microbial foulings from the first pressure vessel if the specified pressure vessel corresponds to the first pressure vessel, discharging the first cleaning solution from the untreated water inlet pipe of the first pressure vessel, cleaning the second pressure vessel by feeding the second cleaning solution into the second pressure vessel through the inlet pipe for primarily treated water for introducing the primarily treated water into the second pressure vessel to thereby remove an inorganic fouling from the second pressure vessel if the specified pressure vessel corresponds to the second pressure vessel, discharging the second cleaning solution from the second concentrate outlet pipe of the second pressure vessel, and confirming respective differential pressures of the first pressure vessel and the second pressure vessel after the step of cleaning to thereby determine completion of the cleaning.

7. The method for cleaning the reverse osmosis treatment device according to claim 6, further comprising the step of rinsing and removing a cleaning solution from the specified pressure vessel before or after the step of determining the completion of the cleaning.

8. The method for cleaning the reverse osmosis treatment device according to claim 7, wherein a rinse solution used in the step of rinsing and removing includes a permeated water produced by the reverse osmosis treatment device or the untreated water.

9. The method for cleaning the reverse osmosis treatment device according to claim 6, wherein the cleaning is performed when increase in the pressure differences measured in the step of confirming the pressure difference reaches the range of 5% or more and 40% or less compared to the pressure differences before the use of the first pressure vessel and the second pressure vessel.

* * * * *